United States Patent [19]
Robinson

[11] Patent Number: 6,037,914
[45] Date of Patent: Mar. 14, 2000

[54] METHOD AND APPARATUS FOR AUGMENTED REALITY USING A SEE-THROUGH HEAD-MOUNTED DISPLAY

[75] Inventor: Ian N. Robinson, Mountain View, Calif.

[73] Assignee: Hewlett-Packard Company, Palo Alto, Calif.

[21] Appl. No.: 08/920,220

[22] Filed: Aug. 25, 1997

[51] Int. Cl.[7] ................................................. G09G 5/00
[52] U.S. Cl. ........................................ 345/7; 345/8; 345/9
[58] Field of Search ...................... 345/7, 8, 9; 359/630

[56] References Cited

U.S. PATENT DOCUMENTS

| | | | |
|---|---|---|---|
| 5,281,960 | 1/1994 | Dwyer, III | 345/31 |
| 5,421,589 | 6/1995 | Monroe | 273/437 |
| 5,572,343 | 11/1996 | Okamura et al. | 359/53 |
| 5,673,059 | 9/1997 | Zavracky | 345/8 |
| 5,712,649 | 1/1998 | Tosaki | 345/8 |
| 5,742,262 | 4/1998 | Tabata et al. | 345/8 |
| 5,742,264 | 4/1998 | Inagaki et al. | 345/8 |
| 5,748,264 | 5/1998 | Hegg | 348/746 |
| 5,790,284 | 8/1998 | Taniguchi et al. | 359/15 |
| 5,793,339 | 8/1998 | Takahashi | 345/7 |
| 5,805,120 | 9/1998 | Yamada et al. | 345/7 |
| 5,844,530 | 12/1998 | Tosaki | 345/8 |

OTHER PUBLICATIONS

Sony Glasstron PLM–50—Personal LCD Monitor; Newbytes News Network—Japanese Site.

J. P. Rolland, R. L. Holloway, and H. Fuchs; "A Comparison Of Optical And Video See–Through Head–Mounted Displays"; SPIE vol. 2351 Telemanipulator and Telepresence Technologies, 1994, pp. 293–307.

David Drascic and Paul Milgram; "Perceptual Issues In Augmented Reality"; SPIE vol. 2653; pp. 123–134.

*Primary Examiner*—Richard A. Hjerpe
*Assistant Examiner*—Marthe Y. Marc-Coleman

[57] ABSTRACT

An image augmentation apparatus for superimposing an overlay image on a portion of a field of view of a user looking through the apparatus at a scene external to the apparatus. The apparatus includes a display screen for generating the overlay image. An optical system creates a virtual image of the overlay image which appears to the user as covering a portion of the field of view. The apparatus utilizes a transmission screen having a two-dimensional array of pixels to block portions of the image of the external scene. The pixels of the transmission screen are either set to a first state in which the pixels are transparent or a second state in which the pixels are opaque. The transmission screen is located such that a pixel set to the opaque state blocks the user from viewing a portion of the field of view of the external scene allowing the user to view only the virtual image in that portion of the field of view. This results in the virtual image appearing to occlude the external scene in that portion of the field of view.

11 Claims, 4 Drawing Sheets

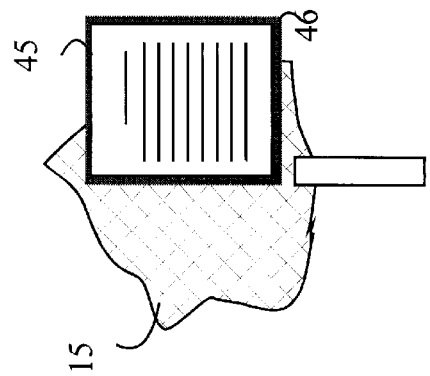
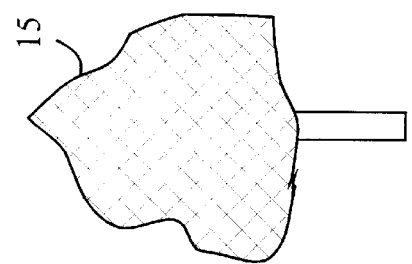
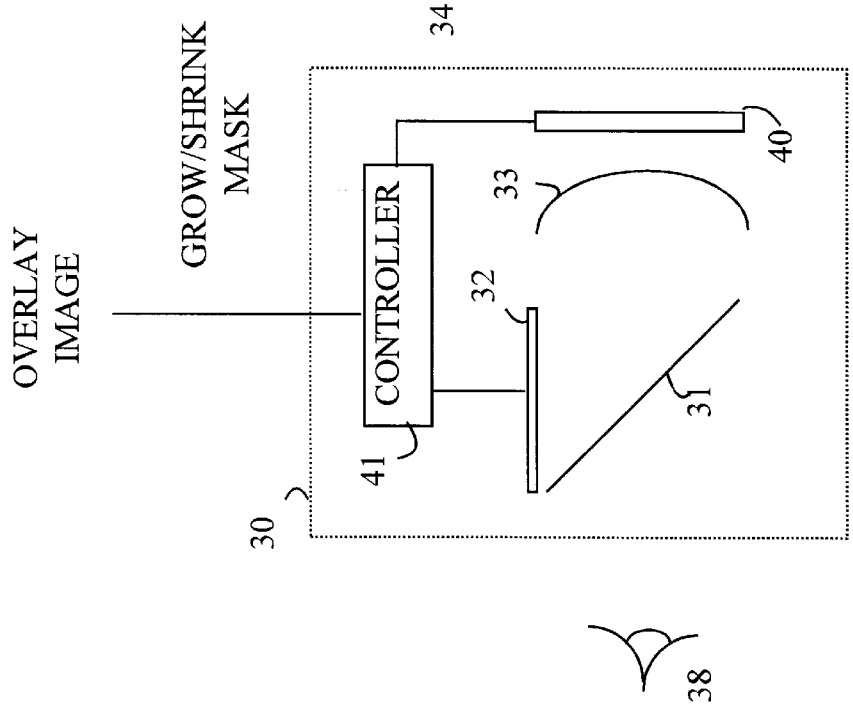
FIGURE 4
FIGURE 3

METHOD AND APPARATUS FOR AUGMENTED REALITY USING A SEE-THROUGH HEAD-MOUNTED DISPLAY

FIELD OF THE INVENTION

The present invention relates to display devices, and more particularly, to a head mounted display for combining computer generated information with the scene being viewed through the display.

BACKGROUND OF THE INVENTION

There are a number of situations in which it would be advantageous to superimpose computer generated information on a scene being viewed by a human viewer. For example, a mechanic working on a complex piece of equipment would benefit by having the relevant portion of the maintenance manual displayed within her field of view while she is looking at the equipment. Display systems that provide this feature are often referred to as "Augmented Reality" systems. Typically, these systems utilize a head-mounted display that allows the user's view of the real world to be enhanced or added to by "projecting" into it computer generated annotations or objects.

In a typical optical see-through head-mounted display, the user's view is an optical combination (via the half-silvered combining mirror) of the external world view and the image presented at the display. The optics are arranged such that the displayed image appears enlarged and at a comfortable viewing distance.

A major disadvantage to a simple optical combination between the transmitted view of real objects and the projected view of the "virtual objects" is the lack of the ability for the latter to occlude the former. The virtual objects appear as translucent objects which overlay the external scene. The "bleed-through" of the external scene makes the viewing of the virtual objects difficult. For example, if the virtual object is a page of text, the text is difficult to read since it is printed on "paper" that contains the external scene.

It has been determined that the occlusion of farther objects by nearer ones is a very strong visual cue in augmented reality. The inability of conventional head-mounted displays to provide this leads to problems in perceiving the depth of the displayed objects. This is particularly problematic in medical applications.

Prior art solutions to the occlusion problem for head-mounted displays have relied on the use of "video see-through" technology. In these systems the external view is captured electronically via video cameras and then combined with the image to be presented. Since the combination is done electronically rather than optically, occlusion can be handled easily in the compositing of the images.

There are several drawbacks to this approach. The resolution, color fidelity etc. of the external view is now limited to that available via the camera/display components. The resolution of the display must now be that needed to accurately represent the scene. In contrast, the resolution of the display in the simple optical mixing systems is determined by the accuracy needed to display the computer generated information. The resolution needed to display a page of text is usually much less than that needed to display an external scene presented to the viewer.

There are also deleterious effects due to the processing delay in the viewing electronics between the user's perception of their own head motion and the corresponding motion of the viewed scene. These processing delays increase as the resolution is increased to provide more realistic representations of the scene from the outside world.

In addition, the computational workload is substantially higher when the computer must process both the scene from the outside world and the material to be added to that scene. This results in increased computer costs which restrict the market for such displays. Lastly the cameras etc. add significantly to the weight, cost, and complexity of the head-mounted display.

Broadly, it is the object of the present invention to provide an improved head mounted display for use in augmented reality systems.

It is a further object of the present invention to provide a display in which the computer generated information does not appear translucent.

It is a still further object of the present invention to provide a display that does not require cameras and compositing software and hardware.

These and other objects of the present invention will become apparent to those skilled in the art from the following detailed description of the invention and the accompanying drawings.

SUMMARY OF THE INVENTION

The present invention is an image augmentation apparatus for superimposing an overlay image on a portion of a field of view of a user looking through the apparatus at a scene external to the apparatus. The apparatus includes a display screen for generating the overlay image. An optical system creates a virtual image of the overlay image which appears to the user as covering a portion of the field of view. The apparatus utilizes a transmission screen having a two-dimensional array of pixels to block portions of the image of the external scene. The pixels of the transmission screen are either set to a first state in which the pixels are transparent or a second state in which the pixels are opaque. The transmission screen is located such that a pixel set to the opaque state blocks the user from viewing a portion of the field of view of the external scene allowing the user to view only the virtual image in that portion of the field of view. This results in the virtual image appearing to occlude the external scene in that portion of the field of view.

BRIEF DESCRIPTION OF THE DRAWINGS

FIG. 3 is a schematic drawing of an image augmentation system according to the present invention.

FIG. 4 illustrates the image produced by the image augmentation system shown in FIG. 3.

DETAILED DESCRIPTION OF THE INVENTION

Figure 1:
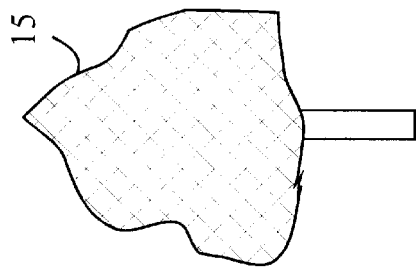
FIG. 1 is a schematic drawing of a prior art image augmentation system.

The present invention may be more easily understood with reference to FIG. 1 which is a schematic drawing of a prior art image augmentation system. A human viewer 18 views a scene 15 through a set of "eye glasses" 10. Information that is to be added to the user's field of view is displayed on a back lighted display screen 12. The output of display screen 12 is combined with the view of the scene 15 with the aid of a half silvered mirror 11 which applies the image to a focusing reflector 13 which is also half silvered. Reflector 13 creates a virtual image of display screen 12 in a plane 14 which is between the glasses and the objects of scene 15. The partially silvered mirror and reflector allow light from scene 15 to reach the viewer.

Figure 2:
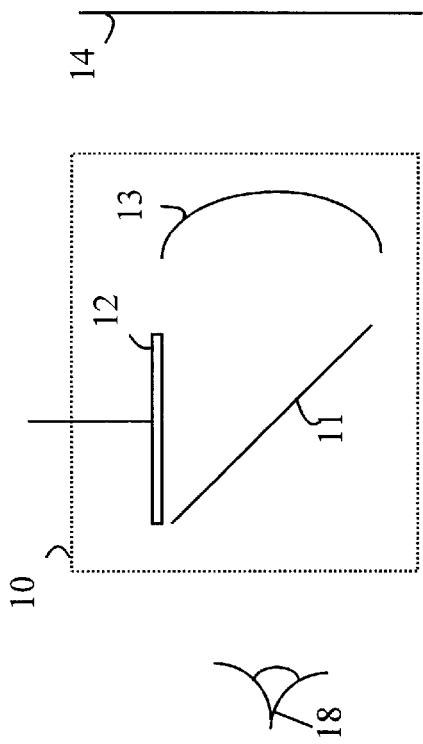
FIG. 2 illustrates the image produced by the image augmentation system shown in FIG. 1.
Figure 2:
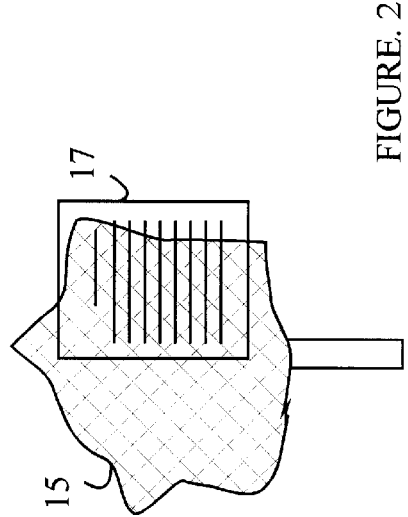

The combined image generated by the glasses is shown in FIG. 2, The material displayed on screen 12 becomes a translucent image 17 in the field of view of viewer 18. Since mirror 11 and reflector 13 must be partially transmitting, the image is the "OR" of the image generated on display screen 12 and that passing through the optics from scene 15. As noted above, the translucent nature of image 17 makes it difficult to view when the scene has significant details in the same region as the image generated by display screen 12.

The present invention provides an overlay image that is opaque by utilizing a transmission mask that blocks the portion of the scene 15 that would ordinarily be ORed with the material generated by display 12. Refer now to FIG. 3 which is a schematic drawing of an image augmentation 30 according to the present invention. Once again, a viewer 38 views a scene 15 through the image augmentation system. The material to be added to the viewer's field of view is displayed on a display screen 32 which generates an overlay image in a virtual plane 34 with the aid of partially reflecting mirror 31 and a partially reflecting focusing reflector 33.

A transmission screen 40 is located between reflector 33 and scene 15. Transmission screen 40 is preferably a liquid crystal transmission screen whose pixels are controlled by controller 41. As will be explained in more detail below, controller 41 determines the portion of the image of scene 15 that is to be overwritten by the material displayed on display screen 32. The pixels of transmission screen 40 corresponding to the overwritten area are then rendered opaque by controller 41. The remainder of transmission screen 40 is left in a transparent state.

The image seen by viewer 38 is shown in FIG. 4. The overlay image inserted via display screen 32 is shown at 45. Since transmission screen 40 has blocked the portion of the image from scene 15 that would have normally been ORed with the overlay image, the translucent quality of the overlay image has been eliminated. It should be noted that the embodiment of the present invention shown in FIG. 3 places transmission screen 40 at a location that is out of focus with respect to viewer 38, and hence, the overlay image appears to have an out of focus silhouette, or "mask", behind it. As a result, the edges of the mask are blurred as shown at 46. Methods for controlling, and even eliminating, this artifact will be discussed in more detail below.

As noted above, controller 41 must determine which parts of transmission screen 40 are to be transparent and which parts are to be opaque. One method for providing this information is to provide separate video signals for the transmission screen and display 32. However, such a scheme requires greater complexity than schemes in which this information is encoded in the video signal used to generate the image on display 32. In the preferred embodiment of the present invention, a unique color is defined which is not used in the image to be projected into the viewer's field of view. This color defines the pixels of the displayed image that are to remain translucent. Controller 41 then sets the corresponding pixels in transmission screen 40 to the clear state. The remaining pixels are set to be opaque. Controller 41 also changes the pixels in the overlay image that were originally set to the unique color to black. In this way the overlay image display will contribute no light in the "transparent" parts of the image.

The above described embodiment of the present invention assumes that the transmission screen has the same resolution as display 32. As noted above, the transmission screen is out of focus in these embodiments. Thus, the apparent resolution of the transmission screen, as seen by the viewer, will be less than that of display 32. Accordingly, a transmission screen having a resolution that is less than that of display 32 may be utilized without substantially reducing the quality of the image seen by the viewer. Since the cost of the transmission screen is related to the number of pixels in the screen, a significant cost savings can be realized by using a screen that has fewer pixels.

When display 32 has a higher resolution than transmission screen 40, each pixel of the transmission screen will overlap a number of pixels in the display. A number of different algorithms may be used to determine the state of a pixel in the transmission screen from the state of the overlapping pixels on the display. For example, a pixel in the transmission screen can be set to opaque if any pixel in the corresponding region of the display is to be displayed on an opaque background. In this case, the opaque mask will typically be larger than the opaque region specified by the pixels of the display. In the other extreme, the transmission screen pixel is set to opaque only if all of the pixels in the corresponding region of the display are marked to be displayed on an opaque background. In this case, the opaque mask will typically be smaller than the opaque region specified by the pixels of the display. Intermediate algorithms, which depend on the fraction of the pixels in the corresponding region of the display that are marked to be displayed on an opaque background, may also be utilized.

The extent to which the mask overlaps the displayed region that is marked as opaque may be controlled independent of any resolution difference between display 32 and transmission screen 40. In general, the transmission screen can be viewed as a display having a binary image. Each pixel is either opaque or clear. As noted above, this image is out of focus in the embodiment of the present invention shown in FIG. 3. As a result, the viewer sees the mask as extending outside of the specified opaque region with a blurred boundary.

Figure 5:
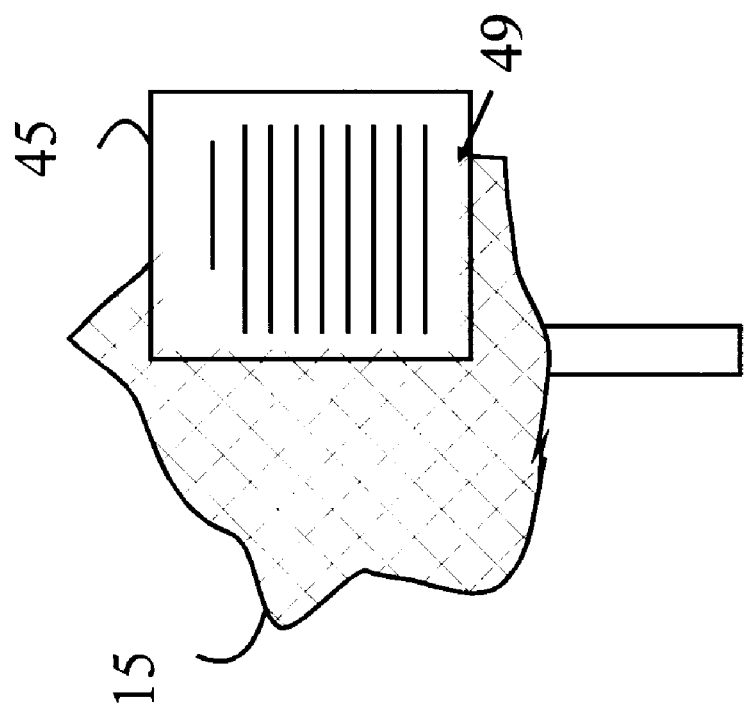
FIG. 5 illustrates an alternative image that may be produced by the image augmentation system shown in FIG. 3.

This boundary can be caused to expand or contract by altering the binary mask image on the transmission screen in a manner which either "grows" or "shrinks" the image. In general, the image on the transmission screen will consist of one or more compact "objects". Each object forms one of the masks discussed above. Algorithms for expanding or contracting such objects are discussed in more detail below. By expanding the mask objects, the displayed image will have the sharpest boundaries, since it will be on a larger mask further from the blurred edges of the mask. However, the portion of scene 15 presented to the viewer will be reduced. Similarly, by shrinking the mask objects on the transmission screen, the edges of the mask will move into the images being displayed leaving the edges of the images translucent as shown at 49 in FIG. 5. However, the portion of scene 15 seen by the viewer will be increased. Accordingly, the preferred embodiment of the present invention has an input on the glasses for expanding or contracting the masks displayed on transmission screen 40.

Figure 6:
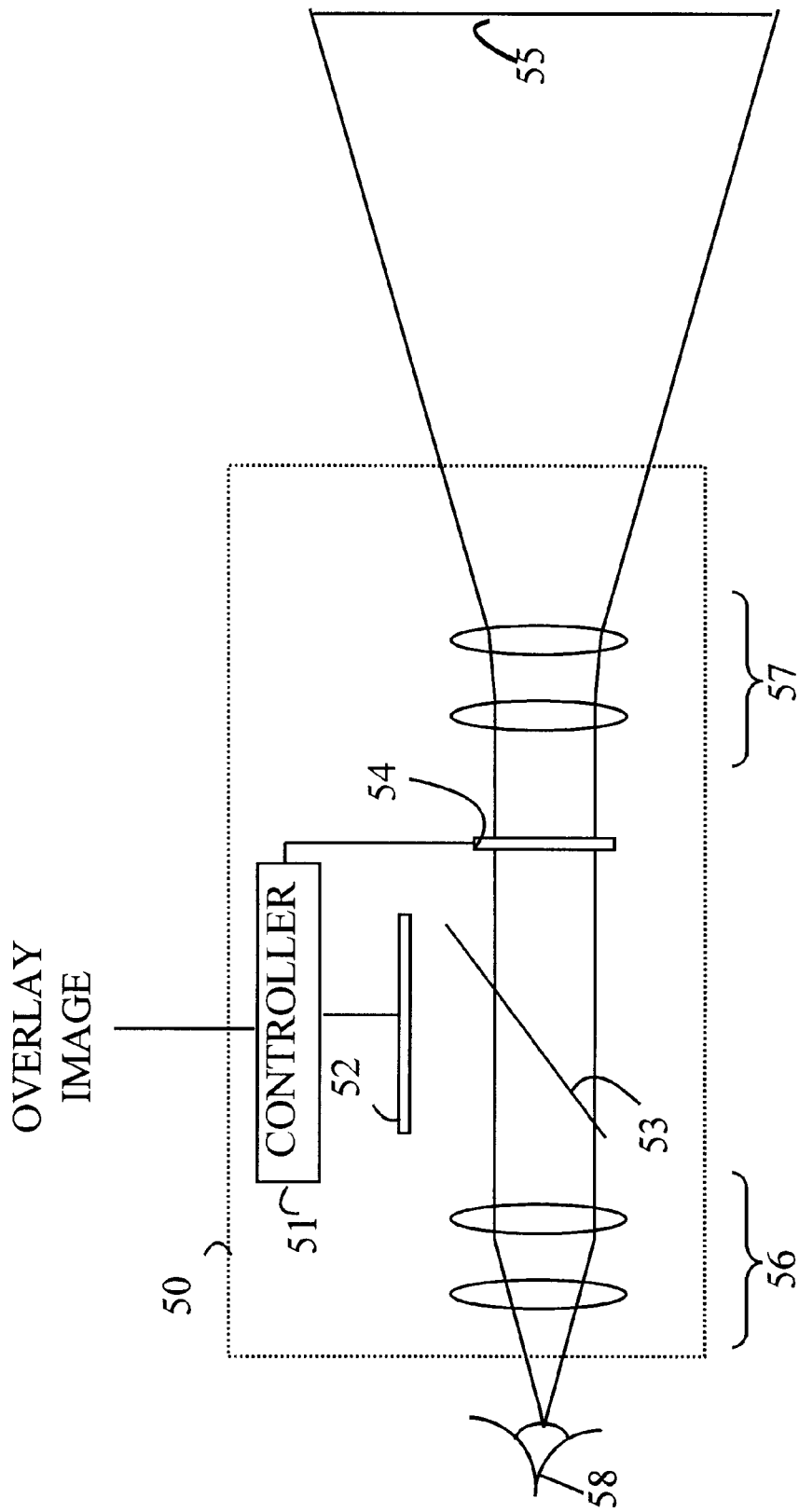
FIG. 6 is a schematic drawing of an embodiment of the present invention in which the image of the transmission screen is in the same focal plane as the scene being viewed by the user.

Embodiments of the present invention which eliminate the out of focus mask may also be constructed. Refer now to FIG. 6 which is a schematic drawing of an image augmentation system 50 according to the present invention in which the mask is always in focus. Augmentation system 50 utilizes two sets of lenses shown at 56 and 57 to collimate the light originating in image plane 55. A transmission screen 54 is placed between these two sets of lenses between mirror 53 and the plane 55. The overlay image to be added to the scene is again generated by a display screen 52 which is controlled by controller 51 which receives the augmentation image. The image generated by display screen 52 is reflected by a half silvered mirror 53. The first set of lenses 56 has a focal length chosen to image display screen 52 at image plane 55. Controller 51 sets the pixels of transmission screen 54 in a manner analogous to that described for augmentation in system 30.

While display system 50 removes the effects associated with the out-of-focus transmission screen, display system 50 has its own limitations. The focusing optics 57 only allow a limited depth of field. Hence, the viewer will not be able to focus on objects that are substantially out of plane 55.

In the above described embodiments of the present invention, a controller controls the transmission screen and performs the computations needed in the case in which the transmission screen image is to have a different resolution or size from that specified in the augmentation image. Such control computations and functions may be accomplished using programmable controllers or discrete logic elements. Those skilled in the control arts will recognize that the computations needed to control the transmission screen are relatively simple. For example, to determine the pixels of the transmission screen that are to be left transparent, the controller need only compare the color assigned to each pixel in the augmentation image to a predetermined color which marks the transparent pixels. The corresponding pixels in the transmission screen are then set accordingly. Similarly, the computations needed to control a screen having a coarser resolution than the display screen requires only that the pixels in the display image corresponding to each pixel in the transmission screen be identified and a simple counting algorithm applied in the case that all of the corresponding pixels are not transparent.

Algorithms for expanding the image on the transmission screen by a pixel are also known to the image processing arts. To expand the image, each pixel on the image is replaced by 3×3 block of pixels. This increases the boundary of the mask image by one pixel while leaving the internal pixels unchanged. Similarly, the image may be shrunk by one pixel by scanning the image with a 3×3 pixel window. Each time the window has all pixels set to be opaque, the current pixel at the center of the window is set to opaque, otherwise the pixel is set to transparent. These algorithms may be applied iteratively, or with larger masks (e.g. a 5×5 mask for up to two pixel grow/shrink operations), to generate images that are expanded or contracted by more than one pixel.

Various modifications to the present invention will become apparent to those skilled in the art from the foregoing description and accompanying drawings. Accordingly, the present invention is to be limited solely by the scope of the following claims.

What is claimed is:

1. An apparatus for superimposing an overlay image on a portion of a field of view of a user looking through said apparatus at a scene external to said apparatus, said apparatus comprising:

a display screen for generating said overlay image;

an optical system for creating a virtual image of said overlay image which appears to said user as covering a portion of said field of view, said virtual image being in focus when said field of view is seen by said user as being in focus; and a transmission screen having a two-dimensional array of pixels that may be set to a first state in which said pixels are transparent and a second state in which said pixels are opaque, said transmission screen being located such that a pixel set to said opaque state blocks the user from viewing a portion of said field of view of said external scene, allowing the user to view only said virtual image in that portion of said field of view, said transmission screen being located at a distance from said user such that said transmission screen is out of focus when said virtual image is seen as being in focus by said user.

2. The apparatus of claim 1 wherein said optical system generates a virtual image of said overlay image in a plane between said apparatus and any objects of interest within said external scene.

3. The apparatus of claim 2 wherein said optical system comprises a partially reflecting concave mirror between said user and said plane.

4. The apparatus of claim 1 further comprising a controller for receiving a signal specifying said overlay image and for setting said pixels in said transmission screen.

5. The apparatus of claim 4 wherein said overlay image comprises a two-dimensional array of pixels, each pixel in said overlay image having a corresponding pixel in said transmission screen, said controller setting the state of each pixel in said transmission screen based on the corresponding pixels in said overlay image.

6. An apparatus for superimposing an overlay image on a portion of a field of view of a user looking through said apparatus at a scene external to said apparatus, said apparatus comprising:

a display screen for generating said overlay image;

an optical system for creating a virtual image of said overlay image which appears to said user as covering a portion of said field of view, said virtual image being in focus when said field of view is seen by said user as being in focus;

a transmission screen having a two-dimensional array of pixels that may be set to a first state in which said pixels are transparent and a second state in which said pixels are opaque, said transmission screen being located such that a pixel set to said opaque state blocks the user from viewing a portion of said field of view of said external scene, allowing the user to view only said virtual image in that portion of said field of view, said transmission screen being located at a distance from said user such that said transmission screen is out of focus when said virtual image is seen as being in focus by said user; and a controller for receiving a signal specifying said overlay image and for setting said pixels in said transmission screen, wherein said overlay image comprises a two-dimensional array of pixels, each pixel in said overlay image having a corresponding pixel in said transmission screen, said controller setting the state of each pixel in said transmission screen based on the corresponding pixels in said overlay image, wherein said signal specifies a color for each pixel in said overlay image, and wherein said controller sets a pixel in said transmission screen corresponding to an overlay image pixel having a predetermined color to said first state.

7. The apparatus according to claim 6 wherein said controller changes ech overlay image pixel having said predetermined color to black.

8. An apparatus for superimposing an overlay image on a portion of a field of view of a user looking through said apparatus at a scene external to said apparatus, said apparatus comprising:

a display screen for generating said overlay image;

an optical system for creating a virtual image of said overlay image which appears to said user as covering a portion of said field of view, said virtual image being in focus when said field of view is seen by said user as being in focus;

a transmission screen having a two-dimensional array of pixels that may be set to a first state in which said pixels are transparent and a second state in which said pixels are opaque, said transmission screen being located such that a pixel set to said opaque state blocks the user from viewing a portion of said field of view of said external scene, allowing the user to view only said virtual image in that portion of said field of view, said transmission screen being located at a distance from said user such that said transmission screen is out of focus when said virtual image is seen as being in focus by said user; and a controller for receiving a signal specifying said overlay image and for setting said pixels in said transmission screen, wherein said overlay image comprises a two-dimensional array of pixels, each pixel in said overlay image having a corresponding pixel in said transmission screen, said controller setting the state of each pixel in said transmission screen based on the corresponding pixels in said overlay image, wherein said controller changes the state of at least one of said pixels set to said first state to said second state in said transmission screen in response to said controller receiving an expand signal.

9. An apparatus for superimposing an overlay image on a portion of a field of view of a user looking through said apparatus at a scene external to said apparatus, said apparatus comprising:

a display screen for generating said overlay image;

an optical system for creating a virtual image of said overlay image which appears to said user as covering a portion of said field of view, said virtual image being in focus when said field of view is seen by said user as being in focus;

a transmission screen having a two-dimensional array of pixels that may be set to a first state in which said pixels are transparent and a second state in which said pixels are opaque, said transmission screen being located such that a pixel set to said opaque state blocks the user from viewing a portion of said field of view of said external scene, allowing the user to view only said virtual image in that portion of said field of view, said transmission screen being located at a distance from said user such that said transmission screen is out of focus when said virtual image is seen as being in focus by said user; and a controller for receiving a signal specifying said overlay image and for setting said pixels in said transmission screen, wherein said overlay image comprises a two-dimensional array of pixels, each pixel in said overlay image having a corresponding pixel in said transmission screen said controller setting the state of each pixel in said transmission screen based on the corresponding pixels in said overlay image, wherein said controller changes the state of at least one of said pixels set to said second state to said first state in said transmission screen in response to said controller receiving a shrink signal.

10. An apparatus for superimposing an overlay image on a portion of a field of view of a user looking through said apparatus at a scene external to said apparatus, said apparatus comprising:

a display screen for generating said overlay image;

an optical system for creating a virtual image of said overlay image which appears to said user as covering a portion of said field of view, said virtual image being in focus when said field of view is seen by said user as being in focus; and a transmission screen having a two-dimensional array of pixels that may be set to a first state in which said pixels are transparent and a second state in which said pixels are opaque, said transmission screen being located such that a pixel set to said opaque state blocks the user from viewing a portion of said field of view of said external scene, allowing the user to view only said virtual image in that portion of said field of view, said transmission screen being located at a distance from said user such that said transmission screen is out of focus when said virtual image is seen as being in focus by said user, wherein said overlay image comprises a two-dimensional array of pixels, each pixel in said overlay image having a corresponding pixel in said transmission screen, the number of pixels in said overlay image being greater than the number of pixels in said transmission screen.

11. An apparatus for superimposing an overlay image on a portion of a field of view of a user looking through said apparatus at a scene external to said apparatus said apparatus comprising:

a display screen for generating said overlay image;

an optical system for creating a virtual image of said overlay image which appears to said user as covering a portion of said field of view, said virtual image being in focus when said field of view is seen by said user as being in focus; and a transmission screen having a two-dimensional array of pixels that may be set to a first state in which said pixels are transparent and a second state in which said pixels are opaque, said transmission screen being located such that a pixel set to said opaque state blocks the user from viewing a portion of said field of view of said external scene, allowing the user to view only said virtual image in that portion of said field of view said transmission screen being located at a distance from said user such that said transmission screen is out of focus when said virtual image is seen as being in focus by said user, wherein said optical system comprises first and second imaging components, said first set of imaging components collimating light from a plane in said external scene, and said second set of imaging components generating a virtual image of said overlay image in said plane, said transmission screen being located between said first and second optical components such that each of said pixels of said transmission screen blocks a portion of said collimated light from reaching said viewer but does not block said overlay image from reaching said viewer.

* * * * *